United States Patent [19]
Müller et al.

[11] Patent Number: 4,734,925
[45] Date of Patent: Mar. 29, 1988

[54] PLAIN FILM PLATFORM FOR PROJECTING SCREEN APPARATUS, X-RAY PICTURE APPARATUS OR THE LIKE

[75] Inventors: Jürgen Müller; Günther Schindlbeck; Michael Reichart, all of Munich, Fed. Rep. of Germany

[73] Assignee: AGFA-Gevaert AG, Leverkusen, Fed. Rep. of Germany

[21] Appl. No.: 765,872

[22] Filed: Aug. 14, 1985

[30] Foreign Application Priority Data
Sep. 1, 1984 [DE] Fed. Rep. of Germany ....... 3432258

[51] Int. Cl.⁴ .............................................. G03B 42/02
[52] U.S. Cl. .................................... 378/173; 378/176; 250/475.2; 271/236; 271/238
[58] Field of Search ................................. 378/172–174, 378/176, 181, 182, 175; 250/475.2; 271/235–236, 238, 242, 245, 253–254, 256–257, 31.1; 354/72–74

[56] References Cited
U.S. PATENT DOCUMENTS

| | | | |
|---|---|---|---|
| 2,921,202 | 1/1960 | Berger et al. | 378/176 |
| 3,826,922 | 7/1974 | Ingles | 378/181 |
| 4,293,124 | 10/1981 | Bailey et al. | 271/238 |
| 4,489,428 | 12/1984 | Schwieker | 378/181 |
| 4,539,696 | 9/1985 | Walling et al. | 378/181 |
| 4,583,837 | 4/1986 | Shiga | 355/74 |

FOREIGN PATENT DOCUMENTS
2483212 12/1981 France ............................... 378/181

Primary Examiner—Craig E. Church
Assistant Examiner—John C. Freeman
Attorney, Agent, or Firm—Michael J. Striker

[57] ABSTRACT

A plain film platform for projection screen apparatus for X-ray apparatus has a platform member, a first fixed guiding strip for a film extending along one vertical side, a second fixed guiding strip extending along a lower side near the opposite vertical side over a small part of the platform member, and a third movable guiding strip extending between the first and second guiding strips and displaceable parallel to the lower second guiding strip.

18 Claims, 12 Drawing Figures

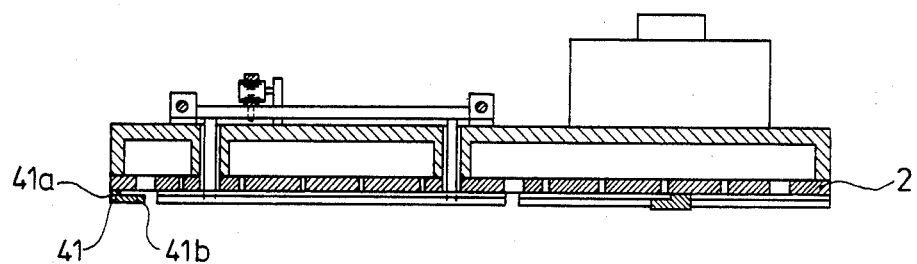
FIG. 3
FIG. 4a    FIG. 4b    FIG. 4c    FIG. 4d
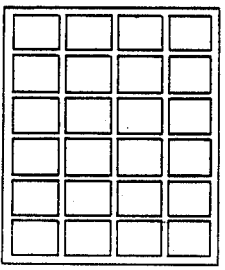 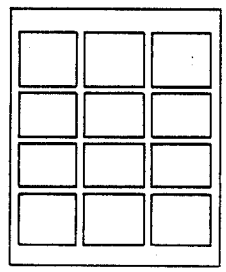 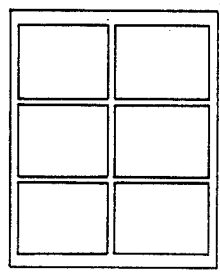 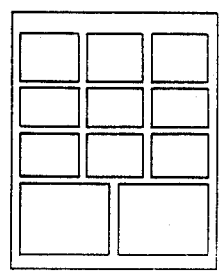
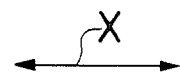
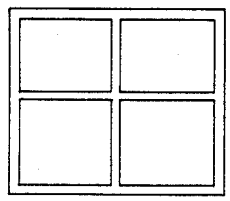 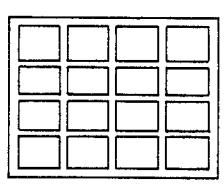 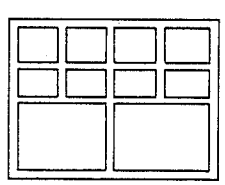 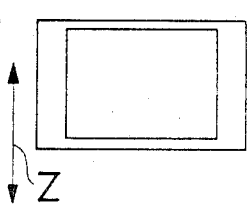
FIG. 4e    FIG. 4f    FIG. 4g    FIG. 4h

PLAIN FILM PLATFORM FOR PROJECTING SCREEN APPARATUS, X-RAY PICTURE APPARATUS OR THE LIKE

BACKGROUND OF THE INVENTION

The present invention relates to a plain film platform for a projection screen apparatus, an X-ray picture apparatus or the like. More particularly, it relates to a plain film platform for such apparatuses which is arranged vertically and open upwardly for automatic insertion and withdrawal of the films, and is provided with guiding strips extending at least along a vertical side and a lower side and having grooves for insertion and holding a film. Advantageously, a vacuum device is provided for vacuum attraction of film to the surface of the platform.

Plain film platforms of this type are customary in the above mentioned apparatus. In the field of X-ray picture apparatuses and projection screen apparatuses of X-ray pictures, a lot of various film formats are used. It is necessary to use the film platform with a size corresponding to films of maximum provided format, which leads to a material waste.

SUMMARY OF THE INVENTION

Accordingly, it is an object of the present invention to provide a plain film platform of the above mentioned type, which avoids the disadvantages of the prior art.

More particularly, it is an object of the present invention to provide a plain film platform of the above mentioned type, which is formed so that it can be adjusted with simple means, for example automatically controllable means, to various required film formats.

In keeping with these objects and with others which will become apparent hereinafter, one feature of the present invention resides, briefly stated, in a plain film platform which has a platform member with vertical and horizontal sides, a first fixed guiding strip extending along one vertical side, a second fixed guiding strip extending along the lower side in the region of the other vertical side over a small part of the lower side, and a movable guiding strip extending between the first and second guiding strips and movable parallel to the lower second fixed guiding strip.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a view showing a section through the inventive film platform of FIG. 1, taken along the line III—III;

FIGS. 4a–4h are views showing possible picture subdivisions on a sheet film of the camera of FIG. 4.

DESCRIPTION OF THE PREFERRED EMBODIMENTS

Figure 4:
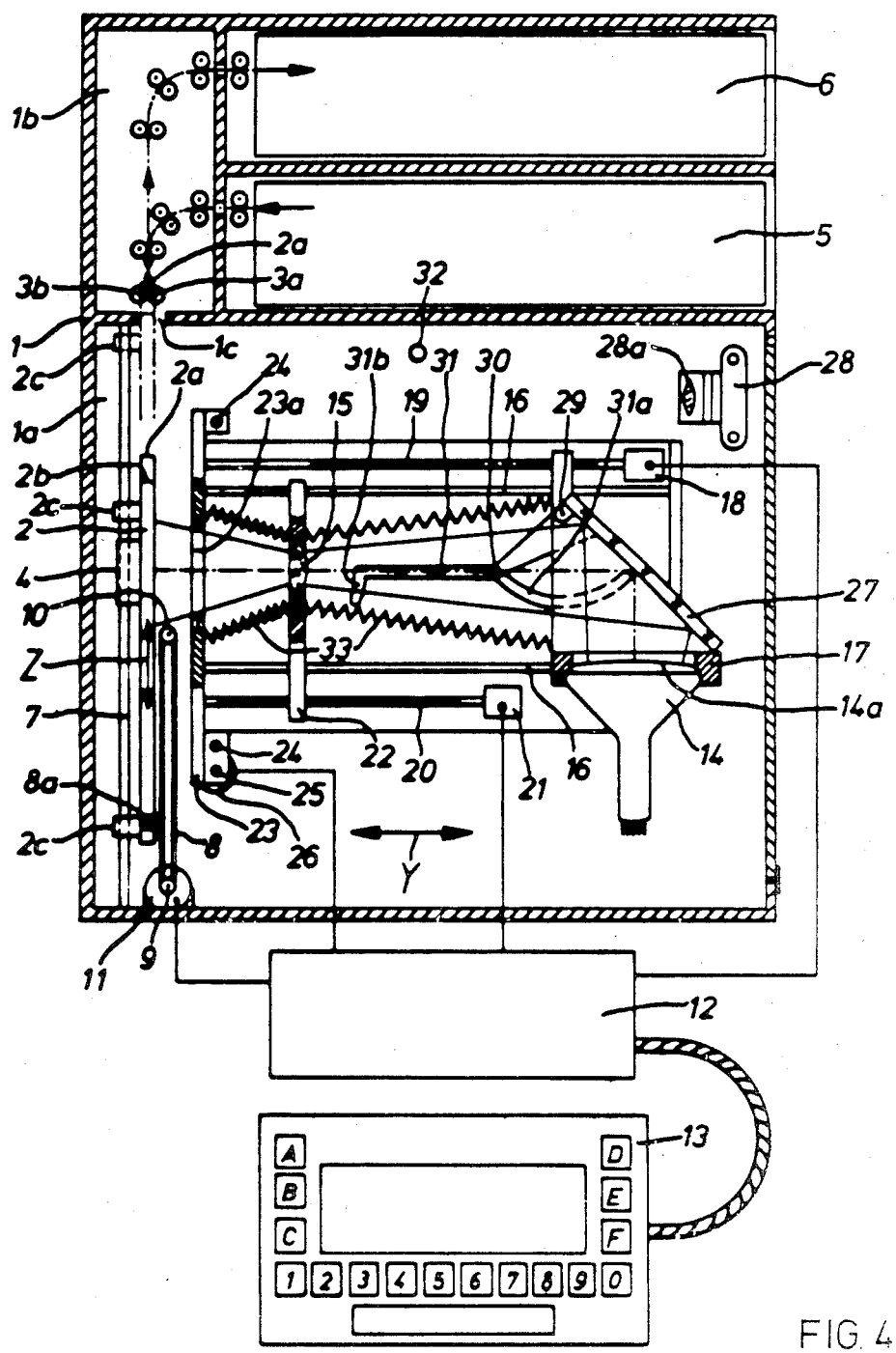
FIG. 4 is a view showing a camera in which the film platform in accordance with FIGS. 1-3 is used.

A sheet film camera in which a sheet film platform in accordance with the present invention is used, is shown in FIG. 4. A schematically shown housing is identified with reference numeral 1 and has a photographic portion 1a and a film loading and unloading portion 1b. A slot between the photographic portion 1a and the film loading and unloading portion 1b is identified with reference numeral 1c. The slot 1c extend in direction of one coordinate, namely the X-coordinate in correspondence with the width of a film platform 2, and has a width in the direction Y normal to the sliding direction Z of the film platform 2, which is sufficient to displace an upper edge 2a of the film platform 2 up to the region of pairs of transport rollers 3a and 3b from the photographic portion 1a into the loading and unloading portion 1b.

The film platform has a known vacuum device 4 and a number of vacuum holes 40, by means of which a film sheet brought to the photographing side of the film platform 2 is reliably held in the vertical position, provided by the vertical position of the film platform 2. The upper edge 2a of the film platform 2 has a plurality of cutouts 2b arranged at certain distances, whereas the transport rollers 3a and 3b lying in the loading and unloading portion 1b are subdivided into a plurality of roller pairs 3a and 3b of somewhat smaller width than the width of the cutouts 2b and arranged in direction X at the locations at which the cutouts 2b lie. The film platform 2 is displaceable in a vertical direction, namely in the X direction upwardly and downwardly, as will be explained hereinbelow. In its uppermost loading and unloading position, the lower part of the roller pair 3a and 3b engages in its cutout 2b.

In the loading and unloading part 1b slide-in units 5 and 6 or further slide-in units are provided, as known in X-ray photographic apparatuses or cassette loading or unloading apparatuses. At least one of the slide-in units 5 holds a sheet film supply magazine with transport means for transporting a film to the roller pair 3a and 3b. In correspondence with the slide-in unit 5, other slide-in units which are not shown for the sake of simplicity, can be used in parallel arrangement for other film formats. The second slide-in unit 6 can have an intermediate magazine for light-tight insertion of exposed film, also by means of the roller pair 3a and 3b. It is also possible to provide a developing machine as a further component connected with the loading and unloading portion 1b. All these supply and intermediate magazines and in some cases the developing machine perform their functions in a light-tight manner at one side. Since this is known and performed in any known manner and is not essential for the present invention, further transport roller pairs are shown schematically before or after the roller pair 3a and 3b in FIG. 4 without reference numerals.

Figure 1:
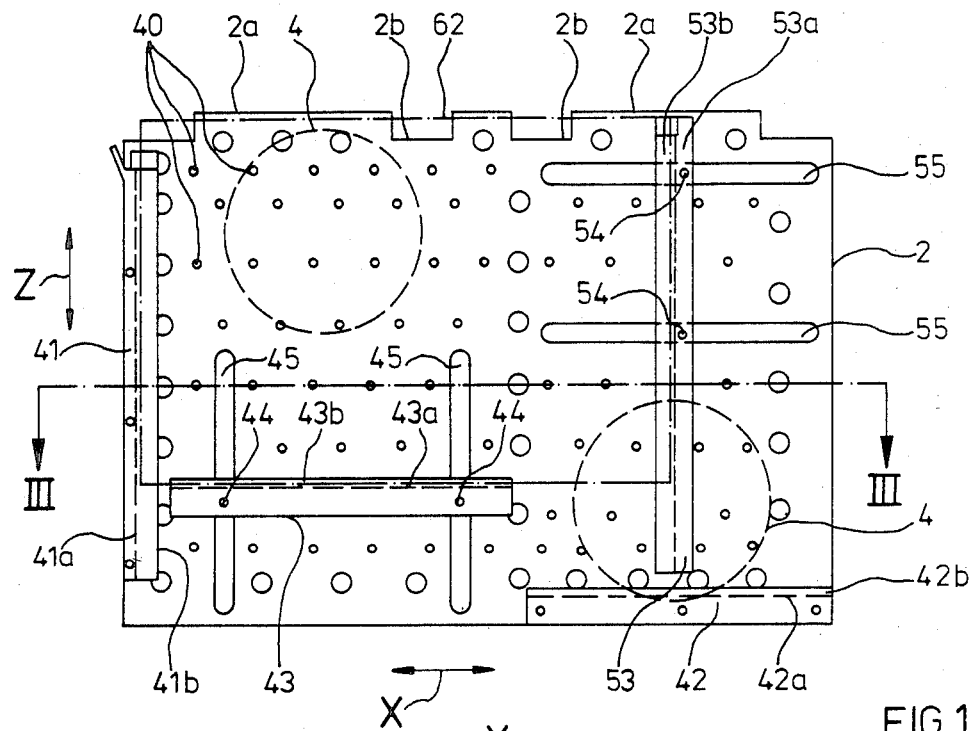
FIG. 1 is a view showing a plain film platform in accordance with the present invention as seen from its film side.

For loading and unloading, the film platform 2 is moved to its uppermost position shown in dash-dot lines in FIG. 1. Then the film lies accessible in the cutouts 2b, it is engaged by the transport roller pair 3a and 3b with the vacuum device shut off, and supplied to the intermediate magazine 6 or the developing machine. In the reverse, the new film to be loaded is taken from the supply magazine and again supplied via the roller pair 3a and 3b to the film platform 2. Then the film assumes there its proper position, the vacuum device 4, 40 is activated to function and the film platform 2 is moved downward to its working position.

Any stepwise or stagewise drivable mechanical or electromechanical displacing device suitable for exact parallel displacement in one direction can be used for positioning the film platform 2. In the illustrated embodiment several arms 2c are provided at the rear side of the platform with exact bores. They are displaceable on at least two parallel bars of which only one bar 7 is shown in FIG. 4. A toothed belt drive 8 or a tow-cable is driveable by means of an electromotor 11 by a controller 12 in a predetermined distances and also connected to the film platform 2 in one position 8a, so that by moving the toothed belt or the tow-cable 8 the film platform is moved a corresponding distance upardly or downwardly in the direction Z. The corresponding distances are determined by a preselected function of a selection keyboard 13. For example, to arrive at an arrangement and size of pictures to be photographed as shown in FIG. 4a, the film platform 2 is first moved in the Z direction six equal steps in each column. The film platform 2 is first moved upwardly for the first photograph column, then moved downwardly for the second photograph column and again moved upwardly for the third photograph column, and again moved downwardly for the fourth photograph column. For other suitable distributed preselectable photograph frame divisions, for example as shown in FIGS. 4b to 4h, the steps of film platform in the Z direction are respectively programmed as required. Thereby, the film platform 2 has only one upward or downward movement in the Z direction.

For providing photographs on the film not only in vertical columns, but also in horizontal rows, as in the direction next to one another and in various sizes, a monitor 14, a picture frame 14a of which is to be photographed, is mounted slidably in the X and Y directions at right angles to the sliding direction of the film platform 2. The picture screen 14a can thereby be oriented parallel to the film platform 2, and a photographic lens 15 can be adjustably oriented between the film platform and the picture screen 14a. In accordance with the illustrated embodiments, the picture screen 14a to be photographed from is however directed upwardly and horizontally to the X-Y plane. The monitor 14 is movable in the Y direction by means of a frame 17 having bore holes, which are not precisely shown in the drawing, that is slidable over a parallel carrier arm 16 and is moved by a driving spindle 19 which is moved by a second electromotor 18. The lens 15 is also slidable along the carrier bar 16 by means of a second spindle 20. The second spindle 20 is driven by a third electromotor 21. The control that provides a preselected or programmed enlargement or reduction of a projection screen picture by changing corresponding positions of the lens 15 and the projection screen 14a in the Y direction is provided by the controller 12 according to the program preselected on the selection keyboard 13. The carrier bars 16 with the carrier frames 17 and 22 for the monitor 14 and the lens 15, respectively, are held by a main supporting plate 23 which is parallel to the film platform 2. The main supporting plate 23 contains an aperture for a frame shutter 23a. The main supporting plate 23 moves slidably in the X direction along guiding bars 24 which are fastened to the housing 1. A third spindle 25 which is driven by a fourth electromotor 26 moves the main supporting plate 23 stepwise from picture to picture in every picture line. This fourth electromotor 26 is controlled by the controller 12 according to a planned program.

Setting either an enlarged or a reduced projection screen image which is to be photographed is achieved by suitable displacement of the lens 15 and the projection screen 14a in the Y direction. Photographing pictures in the vertical column is accomplished by sliding the film platform 2 in the Z direction and maintaining the projection screen 14a in a fixed position. Photographing the images in a horizontal column is accomplished by sliding the projection screen 14a together with the lens 15 in the X direction while maintaining the film platform 2 in a fixed position.

Figure 2:
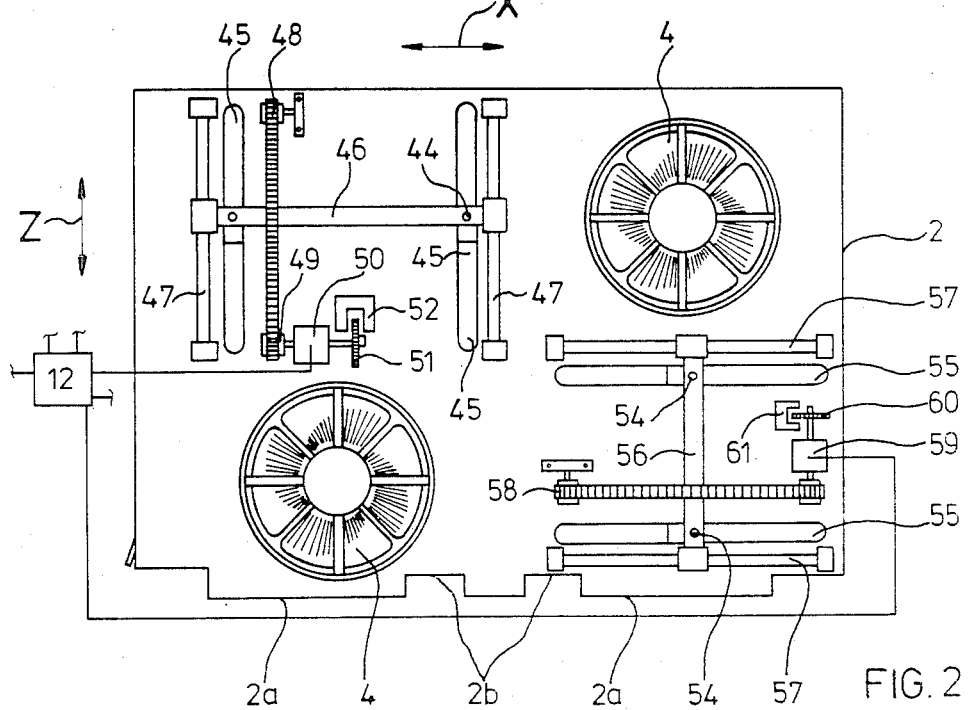
FIG. 2 is a view showing a rear side of the platform of FIG. 1, turned downwardly relative to the position of FIG. 1.

In accordance with the illustrated embodiments, since the projection screen 14a is positioned horizontally, a surface mirror 27 must be provided between the projection screen 14a and the lens 15 at the angle of 45° to the projection screen and the lens. The surface mirror 27 is connected to the projection screen 14a so that it is slidable along with the projection screen. The mirror 27 has two positions, a first position as shown in FIG. 1, which projects the projection screen image to the lens 15, and a second position as shown in FIG. 2, wherein the mirror 27 is rotated through 90° so that the projection screen image is projected through a lens 28a of a roll film camera 28 onto a film plane. To accomplish this the surface mirror 27 is connected to the monitor frame 17 so the mirror 27 can swivel about an axis 29. The mirror 27 has a normal position which facilitates sheet film photography. This normal position is maintained by the horizontal edge of the mirror 27, which is distant from and parallel to the axis 29, resting on the edge of the monitor 14 or on a stopper as a result of the force of gravity.

The mirror 27 has at least one horizontal angle part in the Y-Z plane which is provided with a control peg movable in the X direction, the control peg engaging in a guide slot 31 to control its motion. The guide slot 31 has an end area 31a shaped in an arc about the axis 29. When the mirror 27 is in its furthest position from the film platform 2, as shown in FIG. 1, it can be turned in a counterclockwise direction by hand from outside of the housing through a lockable lid of the housing so as to prevent contamination of the photographic equipment. At the end of the guiding slot 31 which is closest to the film platform, there is a small curved piece 31b that is so formed that when the monitor 14 is moved past the end position for the photographs, as shown in FIG. 2, the mirror 27 is rotated counterclockwise by 90° to an upper position where it contacts a stopper 32. In this position the projection screen image of the monitor 14 is projected into the lens 28a of the roll film camera 20a. This is also accessible through the housing lid as mentioned above, or by another type of housing lid, it is operable in the above discussed manner or by means of a remote control device. The lid can be detachably fastened in any known manner to the housing 1 or the photographing portion 1a.

It requires barely any mention that between the film platform 2, the lens 15 and the frame 17 for the monitor it is necessary to provide light-tight bellows 33.

As mentioned hereinabove, the invention relates to the device of the above described or similar type, for example X-ray picture arrangement, it is not only possible to take several individual pictures of different size and different arrangement on individual sheet film, but also sheet films of different formats can be selectively used. In this case, several compartments for different or identical magazines 5 with different size inserts for different film sizes are available and respective transport means are arranged one above the other in correspondence with the compartments. By means of a control, the desired film size or the respective compartment is controlled. Such arrangements are known in X-ray film cassette loading and unloading devices. With the utilization of the above described device 1, the selection of the desired sheet film size and sheet subdivision, for example, compare FIGS. 4a–4h, is performed also by means of the selection keyboard 13 and the controller 12 in which the selection possibilities can be then programmed.

For taking in the apparatus 1 or in a similar apparatus the photographs of various film format, the film platform 2 must be designed so that the selected sheet film of various sizes can be fixed there in an exact position. For the abutment position of the films of all formats on a vertical platform side (in FIG. 1 it is the left platform side), a strip 41 on a film side is mounted along this (left) platform side. It is step-formed and a step 41a is insignificantly greater than the normal film thickness, so that a projecting rib 41b of the film is placed by the transport rollers 3a and 3b and lying on the step 41a is engaging for its holding and guidance. For the large film format a strip 42, 42a, 42b which is similar to the strip 41 is mounted in the opposite (right) part of the lower platform edge and extends only over a small part of the platform width.

A strip 43, 43a, 43b is similar to the strip 42, and extends parallel to the latter. This strip is displaceable parallel to the X direction between the fixed strip 42 extending in the X direction and the fixed strip 41 extending in the Z direction. For adjusting to smaller film formats, two pins 42 arranged in it extend through guiding slots 45 of the platform 2 which are parallel to the Z direction and are attached at the rear side of the platform 2 to a rail 46 parallel to the X direction The rail 46 is displaceable on two parallel guiding bars 47 extending in the Z direction, together with the strip 43 to the position which is suitable for the selected format. The rail 46 is mounted at one position of a toothed belt 48 running in the Z direction. The toothed belt 48 is driveable by means of a toothed wheel 49 from an electromotor 50. The electromotor 50 is connected with the controller 12 and via the latter via the selection keyboard. Moreover, it drives a counting part 51 of a light barrier 52. This counting part 51 is driven with the motor running, so that the light barrier ccunts the movement steps of the strip 43 in the Z direction actuated by the motor 50. The number of the steps corresponds to the preselected format, so that the motor 50 is turned off via the controller 12.

A further strip 53, 53a, 53b is displaceably supported in mirror-inverted arrangment to the strip 41 and forms the second vertical limit for a selected size of a film sheet. It is supported, displaced and controlled in the manner identical to the strip 43. Pins 54 engage through parallel slots 55 extending in the X direction and are mounted on a rail 56. The rail 56 is guided on bars 57 extending in the X direction and is driven by a motor 59 by means of an endless toothed belt 58. For counting adjustment steps, a counting disc 60 coupled with the motor is provided and passes through a light barrier 61. The adjustment of the strip 53 for a format preselected on the selection keyboard 13 is performed by the counting of the adjusting steps on the light barrier 61 and the turning on of the motor by means of the controller 12.

While for the maximum possible film format adjustment the strip 43 is so controlled that it alignes with the strip 42, and the vertical strip 53 is displaced to the right edge of the platform, the strips 43 and 53 are brought for example for the film format 62 shown in dash-dot line FIG. 1, automatically by the selection keyboard 13 and the controller 12 to the position shown in FIG. 1.

The arrangement shown in FIGS. 1—3 provides for a simply designed film platform 2 namely with relatively simple substantially similar parts 41, 42, 43, 53, or 45, 55, or 46, 56, or 47, 57 or 50, 59, or 51, 60, adjustable to different film formats. Because of their simplicity they can be automatically selected by means known in electronics and adjusted to the selected formats.

The counting members 57 and 60 can also be formed as counting vanes.

It will be understood that each of the elements described above, or two or more together, may also find a useful application in other types of constructions differing from the types described above.

While the invention has been illustrated and described as embodied in a plain film platform for a projection screen or X-ray picture apparatus or the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. X-ray imaging apparatus comprising:
  means for converting an x-ray image into a visible light image;
  means for projecting said image onto a photographing plane;
  film platform means for positioning a plane sheet film in said photographing plane;
  means for storing unexposed sheet film;
  means for storing exposed sheet film;
  means for transporting sheet film between said means for storing and said film platform means wherein said film platform means includes a vertically arranged platform member which is open above for automatic insertion and withdrawal of films and has two vertical sides and upper and lower horizontal sides; and a plurality of guiding strips for inserting and hold a film in direct contact with the film, said guiding strips including a first guiding strip which is fixed and extends along one vertical side of said platform member, a second lower guiding strip which is fixed and extends horizontally at said lower side of said lower side, and a third guiding strip arranged displaceably transversely to said second guiding strip and in the region between said first guiding strip and said second guiding strip in a direction parallel to said second guiding strip; and a fourth strip which is mirror-inverted relative to said first guiding strip and is arranged displaceably in a direction transversely relative to the latter, said fourth guiding strip extending vertically downward to said second guiding strip; and drive means for adjusting the positions of said third and fourth strips.

2. A plain film platform as defined in claim 1, wherein said guiding strips are provided with grooves for insertion and holding of a film.

3. A plain film platform as defined in claim 1; and further comprising a vacuum device for attracting by vacuum a film to a surface of said platform member.

4. A plane film platform as defined in claim 1, wherein said fourth guiding strip is displaceable from an outer edge of said platform member only to said third guiding strip.

5. A plane film platform as defined in claim 1; and further comprising means for guiding said third guiding strip said guiding means including at least two pins provided on said third guiding strip, at least two slots extending in the direction of displacement of said third guiding strip arranged so that said pins engage in said slots, a rail extending parallel to said third guiding strip and connected with said pins, and two guiding bars movably supporting said rail.

6. A plain film platform as defined in claim 5; and where said drive means for driving said third guiding strip further comprises a belt drive connected with said rail at one location and moveable in the movement direction of said second guiding strip, and an electromotor arranged to drive said belt drive.

7. A plain film platform as defined in claim 6, wherein said belt drive of said drive means of said second guiding strip is formed as a toothed belt drive.

8. A plain film platform as defined in claim 6, wherein said third guiding strip is moveable in stepped manner; and further comprising a counting light barrier for counting the steps of movement of said third guiding strip, a counting member associated with said drive means and running through said light barrier, and a controller and a format selection keyboard connected with said counting light barrier.

9. A plain film platform as defined in claim 8, wherein said counting member is associated with one of said motor and said belt drive of said drive means.

10. A plain film platform as defined in claim 8, wherein said counting member is formed as a counting disc.

11. A plain film platform as defined in claim 8, wherein said counting member is formed as a counting vane.

12. A plane film platform as defined in claim 4, further comprising means for guiding said fourth guiding strip said guiding means including at least two pins provided on said fourth guiding strip, at least two slots extending in the direction of displacement of said fourth guiding strip arranged so that said pins engage in said slots, a rail extending parallel to said fourth guiding strip and connected with pins and two guiding bars movably supporting said rail.

13. A plain film platform as defined in claim 12; where said drive means for driving said fourth guiding strip further comprises a belt drive connected with said rail at one location and moveable in the movement direction of said second guiding strip, and an electromotor arranged to drive said belt drive.

14. A plain film platform as defined in claim 13, wherein said belt drive of said drive means of said fourth guiding strip is formed as a toothed belt drive.

15. A plain film platform as defined in claim 13, wherein said fourth guiding strip is moveable in stepped manner; and further comprising a counting light barrier for counting the steps of movement of said fourth guiding strip, a counting member. associated with said drive means and running through said light barrier, and a controller and a format selection keyboard connected with said counting light barrier.

16. A plain film platform as defined in claim 15, wherein said counting member is associated with one of said motor and said belt drive of said drive means.

17. A plain film platform as defined in claim 15, wherein said counting member is formed as a counting disc.

18. A plain film platform as defined in claim 15, wherein said counting member is formed as a counting vane.

* * * * *